United States Patent
Zernickel

(10) Patent No.: US 6,350,203 B1
(45) Date of Patent: Feb. 26, 2002

(54) TORQUE-TRANSMITTING LINEAR ROLLING BEARING

(75) Inventor: Alexander Zernickel, Herzogenaurach (DE)

(73) Assignee: Ina Walzlager Schaeffler oHG (DE)

( * ) Notice: Subject to any disclaimer, the term of this patent is extended or adjusted under 35 U.S.C. 154(b) by 16 days.

(21) Appl. No.: 09/618,427

(22) Filed: Jul. 18, 2000

Related U.S. Application Data

(60) Provisional application No. 60/166,181, filed on Nov. 18, 1999.

(51) Int. Cl.$^7$ .................................. F16C 3/03
(52) U.S. Cl. .................. 464/167; 464/162; 464/906
(58) Field of Search ................. 464/167, 168, 464/162, 169, 172, 178, 906, 147, 150, 152

(56) References Cited

U.S. PATENT DOCUMENTS

| | | | |
|---|---|---|---|
| 2,341,947 A | | 2/1944 | Roberts |
| 2,823,960 A | | 2/1958 | Blazek et al. |
| 3,318,109 A | * | 5/1967 | Ressler et al. ............. 464/167 |
| 3,353,875 A | | 11/1967 | Karge |
| 3,800,558 A | * | 4/1974 | Buthe et al. ................. 464/168 |
| 4,075,872 A | * | 2/1978 | Geisthoff ..................... 464/167 |
| 4,103,514 A | * | 8/1978 | Grosse-Entrup ............. 464/167 |
| 4,705,491 A | * | 11/1987 | Anderson ..................... 464/167 |
| 4,898,566 A | * | 2/1990 | Hakansson ................... 464/167 |
| 5,201,584 A | | 4/1993 | Simons |
| 5,584,765 A | | 12/1996 | Ochiai |
| 6,200,225 B1 | * | 3/2001 | Hobaugh, II ................. 464/167 |
| 6,217,456 B1 | * | 4/2001 | Jacob .......................... 464/167 |

FOREIGN PATENT DOCUMENTS

| | | |
|---|---|---|
| DE | 6809633 | 11/1968 |
| DE | 1924400 | 3/1970 |
| DE | 2227312 | 1/1974 |
| DE | 2346343 | 3/1974 |
| DE | 3124927 | 3/1983 |
| DE | 3303831 | 8/1983 |
| DE | 3308831 | 5/1984 |
| DE | 4119819 | 12/1992 |
| EP | 0281723 | 9/1988 |
| WO | 9809087 | 3/1998 |

* cited by examiner

*Primary Examiner*—Lynne H. Browne
*Assistant Examiner*—Kenn Thompson
(74) *Attorney, Agent, or Firm*—Bierman, Muserlian and Lucas

(57) ABSTRACT

A torque-transmitting linear rolling bearing (16) comprises ball circuits (24) which are formed in a cage (18) between an inner profiled element (17) and an outer profiled element (19), and rolling elements (22) travelling through a first guide track (24a) are elastically biased by a spring sheet (23).

9 Claims, 4 Drawing Sheets

TORQUE-TRANSMITTING LINEAR ROLLING BEARING

This Appln. claims benefit of Provisional Ser. No. 60/166,181 filed Nov. 18, 1999.

FIELD OF THE INVENTION

The invention concerns a linear rolling bearing for transmission of torques about a central longitudinal axis, comprising an inner profiled element and an outer profiled element at least partly surrounding the inner profiled element, wherein the inner and outer profiled elements are arranged for sliding relative to each other in longitudinal direction, the inner profiled element has a non-circular cross-section and at least two torque-transmitting, outwards oriented outer wall sections, at least one torque-transmitting inner wall section of the outer profiled element is associated to each outer wall section, the outer wall sections and the inner wall sections are mounted on each other by rolling elements, the rolling elements are guided in at least one rolling element circuit and the rolling element circuit guides the rolling elements in longitudinal direction of the linear rolling bearing in a first guide track through a loaded zone and thereafter, in a second guide track through a load-free zone.

BACKGROUND OF THE INVENTION

Linear rolling bearings are used in almost all fields of mechanical and automobile engineering. Such bearings serve to mount longitudinally displaceable sliding parts on each other. When used with variable-length telescopic shafts, a bearing of this type must additionally transmit torques transmitted to it from the shaft. Variable-length telescopic shafts are used, for example, as steering shafts in steering columns of modern automobiles. Such steering columns permit the adjustment of the steering wheel position in the interior of the vehicle to suit the individual height and body position of the vehicle operator. This changes the absolute distance of the steering wheel from the steering gear. This change of distance can be corrected by two telescopically slidable shaft ends. Since the steering shaft transmits the steering torque from the steering wheel to the steering gear, the steering shafts have also to be rotationally coupled with each other. The position of the steering wheel is adjusted either manually by the body force of the operator or with the help of electromotors, in both cases, the forces occurring in the sliding fit of the telescopic shafts should not be too high. With the help of a linear rolling bearing disposed between the two shaft ends, the sliding forces are held at a low and relatively constant level over the entire sliding range. Occasionally, steering shafts are also subjected to length variations during vehicle operation. These are short-stroke, oscillating length variations and are caused by a relative movement between the steering gear, together with the lower steering shaft end, relative to the fixed upper steering shaft end.

The linear rolling bearings used are of different types. Frequently, for reasons of economy, linear bearings used in the aforesaid case permit only a limited stroke of one component relative to the other. As a rule, these bearings comprise cage-guided rolling elements situated between the two relatively slidable parts. The cage has a tendency to migrate during operation, particularly in the presence of short-stroke movements. This results in a sliding motion of the rolling elements rather than a rolling motion. In this way, the cage reaches a position in which the operational stroke of the cage is no longer guaranteed. As a result, when larger strokes occur, but also upon short-stroke movements, the rolling elements and the cage are subject to forced movements which result in sliding and impermissible wear.

At first sight therefore, one would consider using a prior art linear rolling bearing that permits an unlimited sliding motion. Such bearings comprise one or more ball circuits in which the balls circulate successively through a loaded zone and a load-free return zone and then again through the loaded zone. In a linear rolling bearing of this type known from DE 33 08 831 A1, a bushing comprises inner and outer rolling bearing raceways and is surrounded on the inside and the outside by cage halves. The cage-guided rolling elements roll from the loaded inner zone on the inner diameter of the bushing and the outer contour of the sliding shaft to and over the outer contour of the bushing and from there, again into the loaded zone. With such bearings, the drawbacks of the aforementioned linear rolling bearings for a limited stroke are avoided. But they have a relatively complicated structure and are not free of play.

For reasons of comfort and smooth operation, a play-free construction of such bearings is often required. Play in the mounting between two ends of a steering shaft means a deterioration of the quality of steering and lack of comfort as a result of possible rattling noises. The quality of steering deteriorates because radial play between the two steering shaft ends manifests itself as a rotary play in the steering wheel. The rattling noises mentioned above are perceived acoustically or through vibrations at the steering wheel and have an unpleasant effect on the operator. The initially mentioned linear rolling bearings with a limited stroke, in contrast, can be configured without play with relatively simple means. For example, EP 0 251 723 B1 describes a torque-transmitting linear rolling bearing in which rolling bearing raceways are supported on the inner component by spring elements. The spring elements urge the rolling elements against the outer component so that a play-free seating of the components relative to each other is assured. Due to the rolling motion of the rolling elements, the displacement of the components relative to each other in longitudinal direction is rendered smoother and is accompanied by low wear only. The components are arranged relative to each other with a very small gap having a dimension which is $\leq$ the spring excursion of the spring elements. The spring elements are designed so that in the presence of normal torsional forces, the rolling elements can absorb any torque. If, however, one component is rotated relative to the other under the action of an excessive torque, the springs deflect to the extent that the components come to bear against each other. The torque is then transmitted directly through the walls of the components, and the rolling elements are relieved of load. The spring elements must be adapted to normal torsional forces. Thus, they function with a relatively high pre-stress even in normal operation. This high pro-stress is detrimental to the running smoothness required under certain circumstances of a linear bearing.

OBJECTS OF THE INVENTION

It is an object of the invention to create a linear rolling bearing which avoids the drawbacks of the aforementioned types of linear rolling bearings.

This and other objects and advantages of the invention will become obvious from the following detailed description.

SUMMARY OF THE INVENTION

The invention achieves these objects by creating a linear rolling bearing in which the rolling element circuit is arranged in a cage and the cage is arranged between an inner wall section of an outer profiled element and an outer wall section of an inner profiled element, one of the inner and the outer profiled elements comprising at least one biasing means acting on the rolling elements in the loaded zone of the rolling element circuit to create a play-free biasing of the inner and outer profiled elements against each other. Such a linear rolling bearing is simple and economic to manufacture. Both the inner and the outer profiled elements are simple to configure and do not need to be provided with additional rolling element raceways, retainers for the cage or other elements for the rolling element circuits. The rolling element circuit is configured-in the rolling element cage. The guide tracks of the rolling elements which are connected to each other to form a circuit, are made exclusively in the cage. The free space required for the return of the unloaded rolling elements can be created with simple means, e.g. in the form of a groove having relatively large tolerances that can be made economically in one or both of the profiled elements. The advantages of a linear rolling bearing with rolling element circuits are utilized while the initially mentioned drawbacks are eliminated.

It is very simple to render such a bearing free of play. This is accomplished by the fact that the rolling elements situated in the loaded zone are urged by a biasing means against a wall section of one or both of the profiled elements, while the biasing means itself is arranged on one or both of the profiled elements. One possibility is to use spring sheets configured as raceways. The spring sheets can be made in a simple manner by punching and bending or stamping out of spring steel or a similar hardened material and have, for example, an arched cross-sectional profile. The spring sheet is arched, as viewed in cross-section, by a dimension that is at least minimally larger than the largest possible theoretical play that can result from manufacturing tolerances in the bearing. Pre-stressed in the mounted state in the linear rolling bearing, the Spring sheet produces a biasing force on the loaded rolling elements which run thereon so that the loaded rolling elements are urged against the opposite wall section. Such spring sheets can also be inserted into both the opposing or associated wall sections. The sheet thickness of the spring sheets and/or geometry of arching is chosen as a function of the required pre-stress. But the pre-stress does not have to be that large for the transmission of torques through the spring shout and the rolling elements to the other wall section. It is sufficient if these spring sheets are designed to produce a pre-stress level that renders the linear bearing free of play for longitudinal movements and in operation.

In one embodiment of the invention, the biasing means is constituted by at least one raceway section of elastic configuration situated in the loaded zone and formed on at least one of the wall sections associated to each other. The already mentioned arched spring sheet is advantageously used in this embodiment as well. In this case, the spring sheet is arched, as seen in cross-section, only in the section in which the loaded zone is situated. The spring action is the same as described in the foregoing paragraph. Alternatively, it is possible to use a substantially flat sheet which is supported on one of the wall sections and produces the pre-stress on the loaded rolling elements by leverage. Such spring sheets can be produced at a minimum cost. The spring pre-stress can be influenced by the sheet thickness and the lever length.

In another embodiment of the invention, when torques are introduced, the loaded zone defects to the extent that the associated wall sections approach each other till at least one section of the cage transmits the torques from one of the associated wall sections to the other of the associated wall sections. The cage is thus not only a means for guiding the rolling elements but also a means for the transmission of torques. The cage is arranged at a relatively small distance from each of the walls. The distance of the cage from the walls determines the magnitude of the torque which is initially transmitted only by the rolling elements. When this torque is exceeded, the loaded zone deflects and the walls approach each other till the cage, or a section of the cage, is clamped therebetween. The magnitude of the torque that is still transmitted by the rolling elements and the raceways can be defined by the configuration of the elastic elements in the loaded zone and, as already mentioned, by the distance of the cage from the walls. It is therefore proposed in a further embodiment of the invention that the raceway section situated in the loaded zone have an elastic configuration. Such a raceway section can be formed on one wall section, either of the inner or the outer profiled element, or on both the wall sections associated to each other. It is further proposed in this embodiment of the invention that upon introduction of torques, the elastic raceway sections deflect to the extent that the associated wall sections approach each other till a section of the cage is clamped therebetween or till they come into direct contact with each other.

In further embodiments of the invention, the inner profiled element is formed by an inner ring of the linear rolling bearing and the outer profiled element is formed by a bushing of the linear rolling bearing. Such elements can be manufactured economically, especially in mass production, by chipless shaping but also by machining. The advantage of the production of individual elements is that the tubes or shafts in or on which such a linear rolling bearing is used can have a relatively simple configuration. Preferably, the inner or outer ring is pressed into or onto the simply configured profiled elements. However, it is also conceivable that the inner wall sections or the raceways for the rolling elements in the loaded zone be defined directly by the surface of the telescopically slidable components. In this case, it is particularly advantageous if the shaft elements and the associated outer tubes have a simple geometry. A further embodiment of the invention therefore provides that the inner profiled element has a polygonal cross-section with at least three outer wall sections. Three outwards oriented wall sections assure that the forces resulting from torque introduction are uniformly distributed on all the loaded zones of the linear rolling bearing. Irrespective thereof, rectangular, cuboid or other polygonal cross-sections may also be used.

As already mentioned initially, parts made of spring sheet can be configured and manufactured simply and economically. In a further embodiment of the invention therefore, a thin-walled, elastic raceway is provided on one or both of the associated wall sections, and, in the region of the load-free zone, this raceway comprises a longitudinal groove. Such a raceway which is made preferably by stamping, assures that the rolling elements are relieved of load and guided in their circuit. In this embodiment, too, the raceway deflects, at least in the loaded zone, to the extent that the associated wall sections approach each other till they come into contact or till a section of the cage is clamped therebetween. Sufficient free space is created in the respective profiled element for this deflection. The spring sheets are inserted and snapped into the profiled elements in a simple manner and fixed by welding or by other means.

Finally, the invention also provides that the inner profiled element is formed by a section of a steering shaft and the outer profiled element is formed by a second section of a steering shaft of a steering of an automotive vehicle. The majority of components used in steering columns of modern automotive vehicles are made by chipless shaping out of sheet metal. Such steering columns must be simple to manufacture and must have a low weight, a small design space requirement and must function reliably and comfortably. For this reason, the linear bearing of the invention with all its embodiments is particularly suitable for use between telescopically slidable steering shafts.

The invention will now be described with the help of several examples of embodiment illustrated in the appended drawings.

DETAILED DESCRIPTION OF THE DRAWINGS

Figure 1:
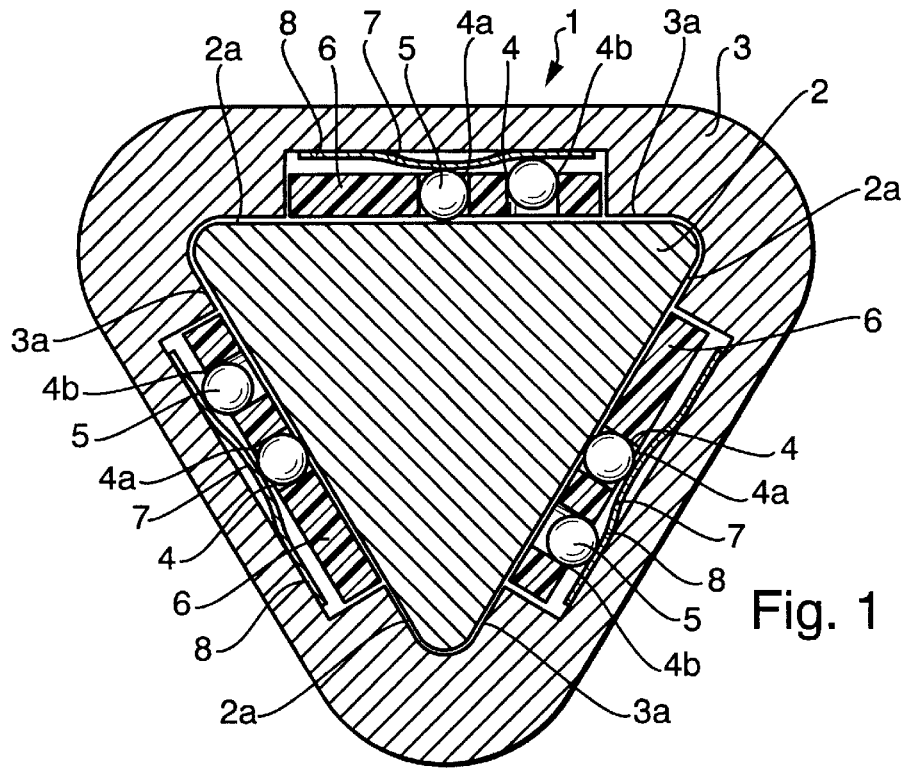
FIG. 1 is a sectional representation of one embodiment of the linear bearing of the invention having one rolling element circuit for each wall section.

An example of embodiment of a linear rolling bearing of the invention is identified in FIG. 1 at 1. The linear rolling bearing 1 comprises an inner profiled element 2, an outer profiled element 3 and rolling element circuits 4. The inner profiled element 2 is formed, for example, on a lower section of a steering shaft and the outer profiled element 3 is formed on an upper section of a steering shaft. The inner profiled element 2 is polygonal in shape and has three identically configured outer wall sections 2a. An inner wall section 3a of the outer profiled element 3 is associated to each outer wall section 2a. Every outer wall section 22 is mounted by rolling elements 5 on its associated inner wall section 3a, and a cage 6 is mounted between each outer wall section 2a and inner wall section 3a. A rolling element circuit 4 in which the rolling elements 5 circulate is defined in each cage 6. A raceway section 8 of elastic configuration is inserted into each inner wall section 3a. As viewed in cross-section, the raceway section 8 comprises an arching 7 and is mounted with pre-stress in the linear rolling bearing 1. The raceway section 8 transmits the pre-stress to the outer wall section 2a through rolling elements 5 situated in a first guide track 4a of the ball circuit 4. The rolling elements 5 are guided in the first guide track 4a through a loaded zone of the ball circuit 4. The ball circuit 4 comprises a second guide track 4b in which the rolling elements 5 are guided through a load-free zone. The pre-stress acting on the three sides of the linear bearing 1 renders the linear rolling bearing 1 free of play. Torques are transmitted from the inner profiled element 2 via the outer wall section 2a through the inner wall section 3a to the outer profiled element 3, and vice versa. During torque transmission, the inner and outer profiled elements 2 and 3 bear against each other and the raceway section 8 is deflected inwards in the loaded zone.

Figure 2:
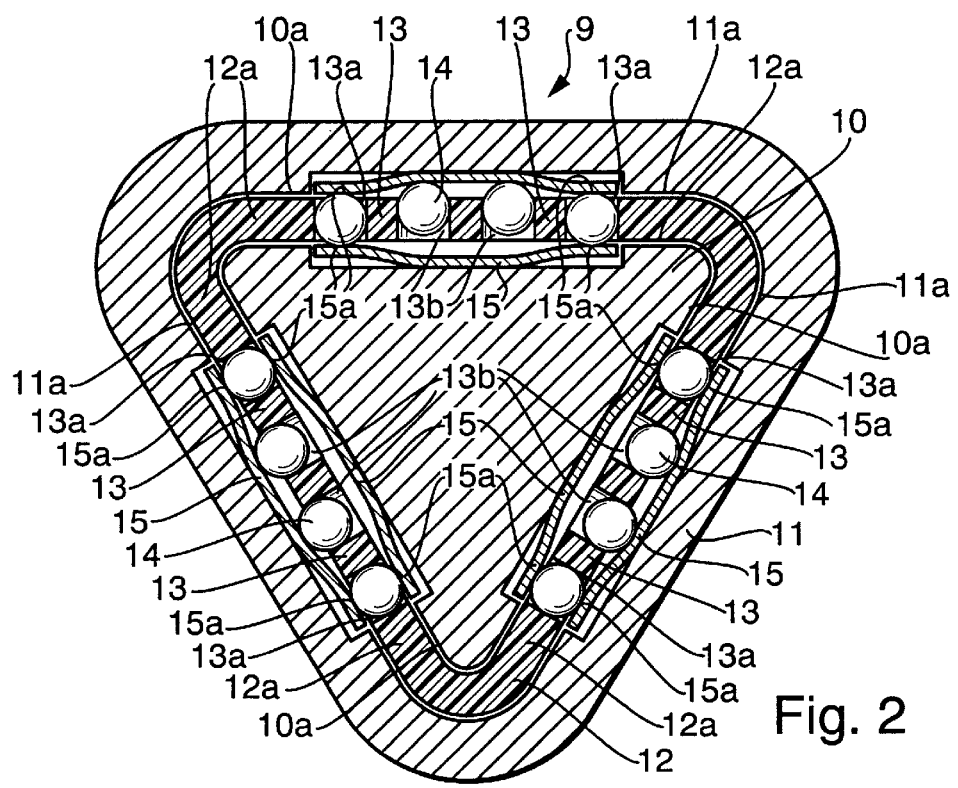
FIG. 2 shows a further embodiment of the invention having two ball circuits for each inner wall section and elastic raceways on each of the two associated wall sections.

FIG. 2 shows a further embodiment of the invention. A linear rolling bearing 9 is formed by an inner profiled element 10, an outer profiled element 11 and a cage 12 which, as viewed in cross-section, surrounds the inner profiled element 10. The inner profiled element 10 again comprises three outer wall sections 10a. Two rolling element circuits 13 are associated to each outer wall section 10a. The rolling elements 14 are again configured as balls. The rolling elements 14 situated in a first guide track 13a of the rolling element circuit 13 are pre-stressed from two sides by elastic raceway sections 15a of biasing elements configured as spring sheets 15 and arranged in each outer wall section 10a and in each inner wall section 11a associated to the outer wall section 10a. When a linear movement takes place, the rolling elements 14 are returned free of load through a second guide track 13b of the rolling element circuit 11. Torques are transmitted from the inner profiled element 10 via three sections 12a of the cage 12 to the outer profiled element 11 by the fact that the inner profiled element 10 acts on the sections 12a of the cage 12 and presses the cage 12 against the inner wall sections 11a of the outer profiled element 11, and vice versa. The raceway sections 15a are thereby deflected to the same or to a different extent.

Figure 3:
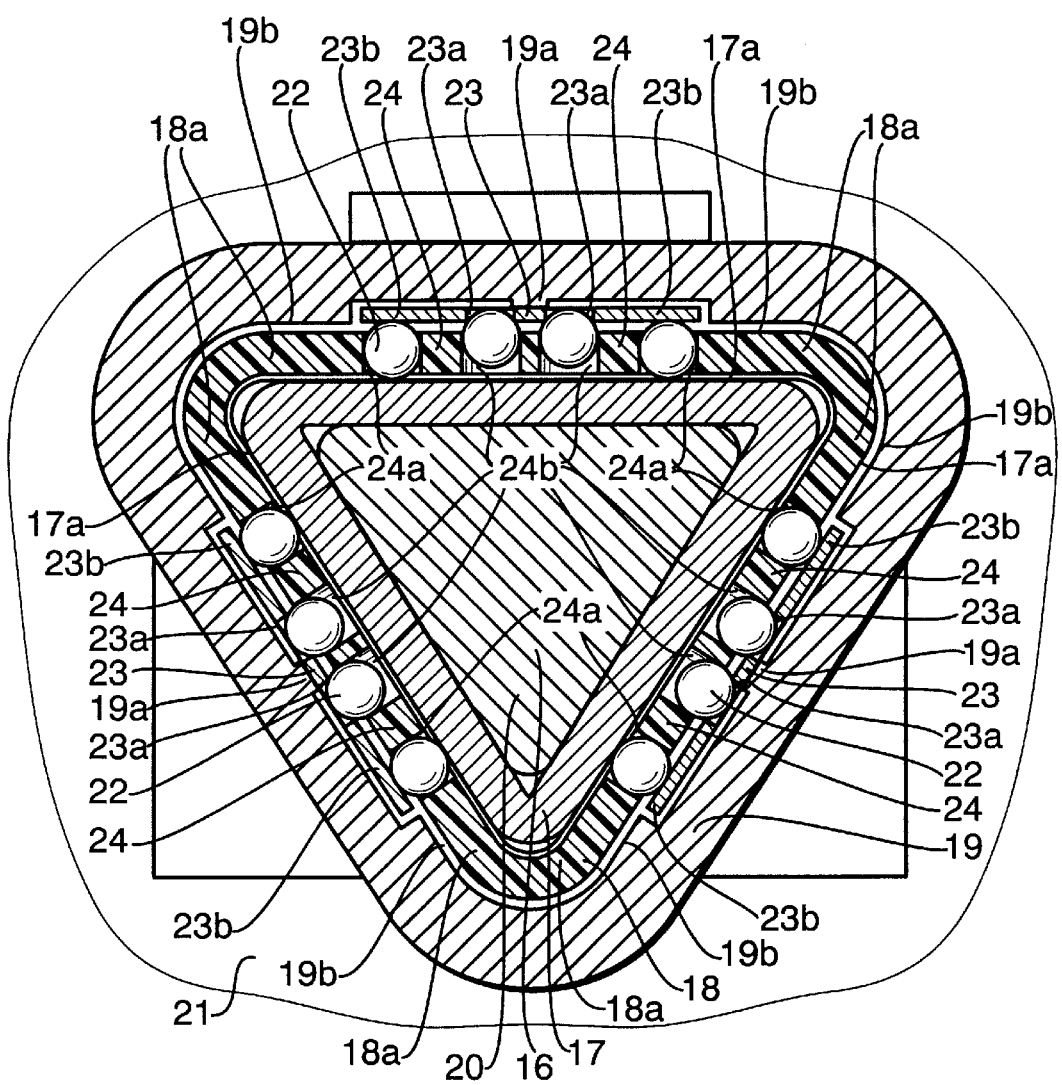
FIG. 3 shows another embodiment of the linear rolling bearing of the invention having elastic raceways which are inserted into the outer profiled element.

FIG. 3 shows a further embodiment of a linear rolling bearing 16 of the invention. The inner profiled element of this linear rolling bearing 16 is formed by an inner ring 17 which is surrounded by a cage 18. The cage 18 is arranged between the inner ring 17 and an outer profiled element made as an outer ring 19. The inner ring 17 is seated on a section 20 of a shaft, while the outer ring 19 is pressed into a housing 21, only roughly indicated. The inner ring 17 comprises three outer wall sections 17a of identical configuration. Biasing means in the form of spring sheets 23 are inserted into the outer ring 19 and received on a projection 19a of the outer ring 19. The cage 18 comprises two rolling element circuits 24 for each wall section 17a. Rolling elements 22 under load travel through a loaded zone of the ball circuit 24 in a first guide track 24a. This loaded zone is produced by an elastic, pre-stressed raceway section 23b of the spring sheet 23. In the second guide track 24b, the rolling elements 22 run free of load. This load-free state of the rolling elements 22 in the second guide track 24b is achieved by providing the free space required therefor in the form of a longitudinal groove 23a in the spring sheet 23. Torques from the section 20 of the shaft are transmitted to the housing 21 through the inner ring 17 and the cage sections 18a and further through the inner wall sections 19b of the outer ring 19. The spring sheet 23 is thereby deflected in the region of the loaded zone.

Figure 4:
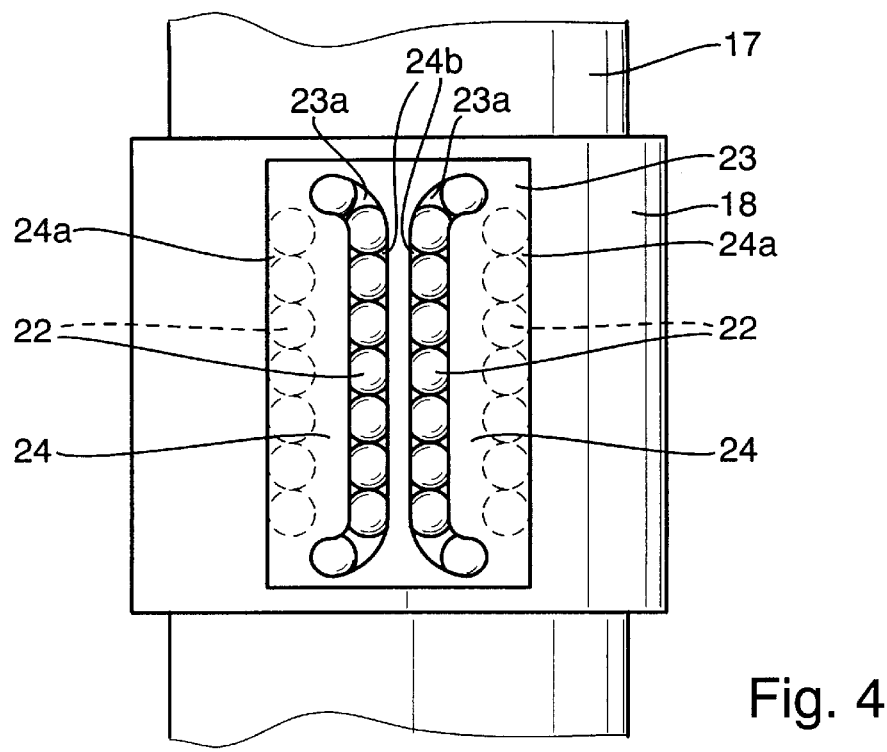
FIG. 4 is a top view of the linear rolling bearing of FIG. 3 without the outer ring.

FIG. 4 shows the linear rolling bearing 10 of FIG. 3 without the outer ring, the cage being shown in a top view in which the ball circuits 24 situated next to each other are visible. The rolling elements 22 represented in broken lines travel through the loaded zone in the first guide track 24a. After traversing the first guide track 24a, the rolling elements 22 are deflected into the second guide track 24b. The longitudinal groove 23a assures that the rolling elements 22 travel in a load-free state through the second guide track 24b.

Figure 5:
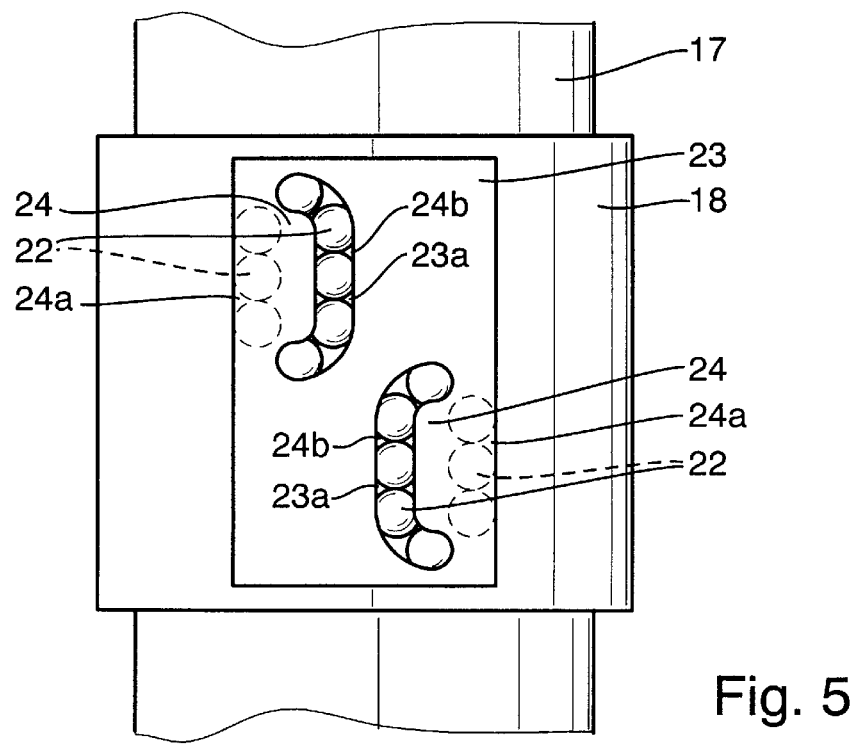
FIG. 5 is a top view of the linear rolling bearing of FIG. 3 without the outer ring, showing an alternative to the configuration of FIG. 4.
Figure 6:
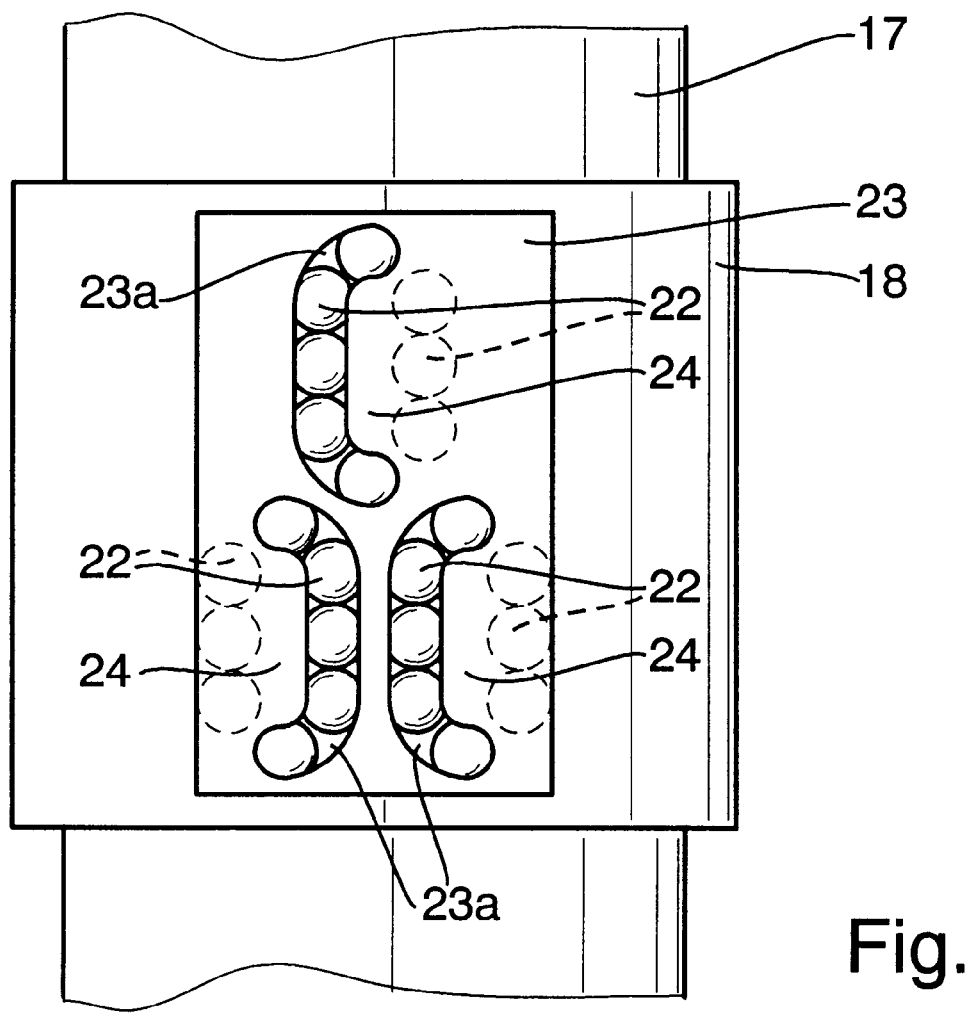
FIG. 6 shows a further alternative to that of FIG. 4.

FIGS. 5 and 6 show alternative arrangements of the ball circuits 24. In FIG. 5, the ball circuits 24 are arranged at an offset in the longitudinal direction of the cage 18 but parallel to each other. FIG. 6 shows a cage 18 which comprises three ball circuits 24 between every two associated wall sections.

What is claimed is:

1. A linear rolling bearing for transmission of torques about a central longitudinal axis, comprising an inner profiled element and an outer profiled element at least partly surrounding the inner profiled element, wherein the inner and outer profiled elements are arranged for sliding relative to each other in longitudinal direction, the inner profiled element has a non-circular cross-section and at least two torque-transmitting, outwards oriented outer wall sections, at least one torque-transmitting inner wall section of the outer profiled element is associated to each outer wall section, the outer wall section and the inner wall section are mounted on each other by rolling elements, the rolling elements are guided in at least one rolling element circuit, the rolling element circuit guides the rolling elements in longitudinal direction of the linear rolling bearing in a first guide track through a loaded zone and thereafter, in a second guide track through a load-free zone, the rolling element circuit is formed in a cage arranged between the inner wall section and the outer wall section, at least one of the inner and the outer profiled elements comprising at least one biasing means acting on loaded rolling elements to create a play-free biasing of the inner and outer profiled elements against each other.

2. Linear rolling bearing of claim 1 wherein the biasing means is constituted by at least one raceway section of elastic configuration situated in the loaded zone and formed on at least one of the wall sections associated to each other.

3. Linear rolling bearing of claim 1 wherein the biasing means is constituted by at least one raceway section of elastic configuration situated in the loaded zone and formed on at least one of the wall sections associated to each other and, upon introduction of torques, the raceway section deflects to an extent that the associated wall sections approach each other till they come into contact with each other or till a section of the cage is clamped between the wall sections.

4. Linear rolling bearing of claim 1 wherein, upon introduction of torques, at least a raceway section deflects to an extent that the associated wall sections approach each other till at least a section of the cage transmits the torques from one of the associated wall sections to the other of the wall sections.

5. Linear rolling bearing of claim 1, wherein the inner profiled element is formed by an inner ring of the linear rolling bearing.

6. Linear rolling bearing of claim 1, wherein the outer profiled element is formed by an outer ring of the linear rolling bearing.

7. Linear rolling bearing of claim 1, wherein the inner profiled element has a polygonal cross-section and comprises at least three outer wall sections.

8. Linear rolling bearing of claim 1, wherein the biasing means is formed by a thin-walled elastic raceway section arranged on at least one of the associated wall sections, in the load-free zone, the raceway section comprises a longitudinal groove and, upon introduction of a torque, the raceway section deflects, at least in the loaded zone, to an extent that the associated wall sections approach each other till they come into contact or till a section of the cage is clamped between the wall sections.

9. Linear rolling bearing of claim 1, wherein the inner profiled element is formed by a first section of a steering shaft and the outer profiled element is formed by a second section of the steering shaft of a steering of an automotive vehicle.

* * * * *